United States Patent [19]

Castille

[11] Patent Number: 4,622,454

[45] Date of Patent: Nov. 11, 1986

[54] WATERPROOF CIGARETTE LIGHTER

[76] Inventor: Leopold A. Castille, Rte. 7, Box 17 E15, Opelousas, La. 70570

[21] Appl. No.: 739,995

[22] Filed: May 30, 1985

[51] Int. Cl.$^4$ .......................... H05B 1/00; F23Q 7/00
[52] U.S. Cl. ...................................... 219/267; 16/118;
 16/121; 200/302.2; 219/242; 219/533
[58] Field of Search ........................ 219/221, 260–270,
 219/533, 242; 16/118, 121; 200/302.2

[56] References Cited

U.S. PATENT DOCUMENTS

| | | | |
|---|---|---|---|
| 1,732,784 | 10/1929 | Wolfson et al. | 219/266 |
| 2,381,726 | 8/1945 | Davis | 219/261 |
| 2,748,229 | 5/1956 | Block | 200/302.2 |
| 4,417,113 | 11/1983 | Saito et al. | 200/302.2 |
| 4,486,918 | 12/1984 | Peebles | 16/121 |

*Primary Examiner*—A. Bartis
*Attorney, Agent, or Firm*—John F. Sieberth

[57] ABSTRACT

The knob of a handpiece for use in a push-pull type electric lighter is provided with an increased diameter portion positioned in closer proximity to the ignition end than the handle portion of the knob. At least one O-ring or like seal is mounted around the periphery of the increased diameter portion of the knob. The outer end of the socket which protrudes through an aperture in a panel, and the portion of the handpiece extending out from the socket when fitted into the socket are encased (except for the handle portion of the knob) in a hollow open-ended tubular housing mounted on the face of the panel. The O-ring of the handpiece is adapted to engage the interior wall of the tubular housing and form a water-tight, slidable seal therewith yet permit the handpiece to be pushed into and be pulled from the socket by means of the handle portion of the knob. The portions of the socket extending to the rear of the panel may be, and preferably are, encased by another housing. A fastening system is described enabling the one or both of the housing members to be secured to the panel by the same means that secure the socket to the panel.

14 Claims, 3 Drawing Figures

WATERPROOF CIGARETTE LIGHTER

TECHNICAL FIELD

This invention relates to a novel waterproof electric cigarette lighter assembly and to novel specialized components therefor.

BACKGROUND

There are various situations in which conventional push-pull type electric cigarette lighter assemblies are rendered inoperable because of exposure to water. In boats, for example, water oftentimes splashes upon the dashboard or control panel where such lighters are usually placed. Exposure to rain is another cause of this problem. Likewise, in humid climates dew may accumulate on the cigarette lighter parts exposed to cool night air.

A need thus exists for a simple, practical, economical system to render push-pull type electric cigarette lighters waterproof. This invention is deemed to fulfill this need most expeditiously.

THE INVENTION

In accordance with this invention a push-pull type electric cigarette lighter of conventional design is rendered waterproof by use of a novel, inexpensive assembly comprising novel specialized components. The assembly is easy to install and is adapted for use with push-pull type electric cigarette lighters of customary designs and constructions. Thus the invention not only can be utilized with conventional lighters irrespective of the source or manufacturer but the manufacturers need not alter their designs to permit use of the assembly of this invention (but of course they could do so if they should wish to do so). And once installed, the assembly is effective, durable and trouble-free in use.

As is well known to those skilled in the art, conventional push-pull type electric cigarette (or cigar) lighters are composed of a handpiece and a socket or receptacle. The handpiece is made up of longitudinally slidable tubular carrier means, an electrically heatable ignition member carried by and positioned in proximity to the inner end of the carrier means, and a knob mounted on the outer end of the carrier means. The socket is designed to slidably receive the carrier means and is adapted to electrically energize the ignition member when the carrier means is moved into an inner position in the socket, the electrical energy usually being supplied by a battery or generator used to power the boat or vehicle. Normally the handpiece is held in an outer position in the socket wherein no electric current is applied to the ignition member. When it is desired to use the lighter, the handpiece is pushed by means of the knob to an inner position in the socket whereby an electrical circuit is completed and the ignition member becomes heated by resistance heating. When the ignition member is sufficiently hot (usually at red heat) the handpiece pops out to is original outer position from whence it is removed from the socket by means of the knob, put to use, and returned to its normal position in the socket. Since the details of design and construction of such lighters are well known and form no part of this invention, such details need not be further considered hereinafter.

Pursuant to one embodiment of this invention push-pull type electric lighters are rendered waterproof by providing hollow tubular housing means encasing the carrier means, the ignition member and the socket means of the lighter, and by providing sealing means to effect a watertight, slidable seal between a peripheral portion of the knob and the housing. Although watertight, the sealing means, such as one or more O-rings mounted around a peripheral portion of the knob, permits the carrier means to be moved by means of the knob into said inner position in the socket means. The sealing means employed also permits the handpiece to pop-out to its normal outer position in the socket. In short, the waterproofing system of this invention does not impair in any way the normal functioning of the lighter assembly.

In the "complete encasement" embodiments of this invention as above described, it is preferred to provide as the housing means a pair of longitudinally aligned members, namely a front housing member mountable against the front side of a panel carrying the lighter assembly and a rear housing member mountable against the back side of the panel. It is particularly desirable in these embodiments that the socket include a pair of coaxially aligned concentric tubular means threadably secured to each other at their back end portions, i.e., their ends most remote from the panel to which the socket is secured, that the end portion of the inside tubular means have a radially outwardly extending flange adapted to be positioned on the front side of the panel, and that the innermost portion of the front housing member have a radially inwardly extending flange adapted to be interlocked behind the flange of the inside tubular means and fastened against the front side of the panel when the tubular means of the socket are threadably secured to each other. For best results a watertight washer is positioned between said inwardly extending flange and the front side of the panel against which this flange is fastened. Likewise it is preferred to position a watertight washer between the rear housing member and the back side of the panel against which the rear housing member is fastened.

Another embodiment of this invention is a novel knob construction which makes it possible to waterproof push-pull type lighters most expeditously without impairing their use. The knob is characterized by having, in addition to its handle portion at its outer end, a radially outwardly extending portion (i.e., a portion of increased diameter) positioned in closer proximity to its inner end. This radially outwardly extending portion has a diameter at least equal to (and preferably greater than) the diameter of the carrier means. At least one O-ring is mounted around the periphery of this radially outwardly extending portion of the knob. While other fastening means may be employed the novel waterproofing knob of this invention preferably has a threaded stud axially extending from its end opposite the handle end. Since the knobs of most conventional push-pull type lighters are threadably secured to the carrier means in this manner, it is a simple matter when modifying a conventional preexisting system to simply unscrew the conventional knob and replace it with a knob of this invention.

Still another embodiment of this invention involves providing an improved handpiece of use in a push-pull type electric lighter, which handpiece includes longitudinally slidable tubular carrier means, an electrically heatable ignition member carried by and positioned in proximity to the inner end of the carrier means, and a knob mounted on the outer end of the carrier means. In such handpiece the improvement involves providing a knob which has an increased diameter portion positioned in closer proximity to the carrier means than the handle portion of the knob and which has at least one O-ring mounted around the periphery of this increased diameter portion of the knob in an appropriately sized groove.

Another preferred embodiment of this invention is a "front encasement" assembly wherein all of the parts of the lighter assembly on the outside of the panel are encased and rendered waterproof. In many instances it is not necessary to encase the parts of the lighter that are located behind the panel as these are frequently protected from water exposure by the boat or vehicle itself. In such cases this preferred embodiment may be employed to advantage. Besides protecting the exposed parts of the lighter against water exposure without interfering with its functioning, this embodiment is even easier to install and involves fewer parts and is less expensive. In this embodiment there is provided the combination of (i) a handpiece as described above adapted to be inserted into a socket the open end of which protrudes through an aperture in a panel, and (ii) a hollow open-ended tubular housing member adapted to be coaxially aligned with the handpiece and to concentrically encase (a) the end portion of the socket which protrudes through said aperture and (b) the portion of the handpiece that extends out in front of the socket when the handpiece is seated therein, except for the handle portion of the knob, the O-ring of the handpiece being adapted to engage the interior wall of the housing member and form a watertight, slidable seal therewith yet permit the handpiece to be pushed into and be pulled from the socket by means of the handle portion of the knob. It will be seen, therefore, that in the "front encasement" embodiment the rear housing member referred to above is not employed.

Another feature of this invention is that in the "total encasement" and in the "front encasement" embodiments the front housing member can be secured to the panel by means of the end of the socket which protrudes through the aperture in the panel. In a particularly preferred form the end portion of the socket that protrudes through the aperture in the panel has a radially outwardly extending flange and the inner end of the front housing member has a radially inwardly extending flange adapted to fit behind the outwardly extending flange and thereby enable the front housing member to be secured to the panel by the same means that secure the socket to the panel.

These and still other embodiments, features and advantages of this invention will become still further apparent from the ensuing description, appended claims, and accompanying drawings in which:

Figure 1:
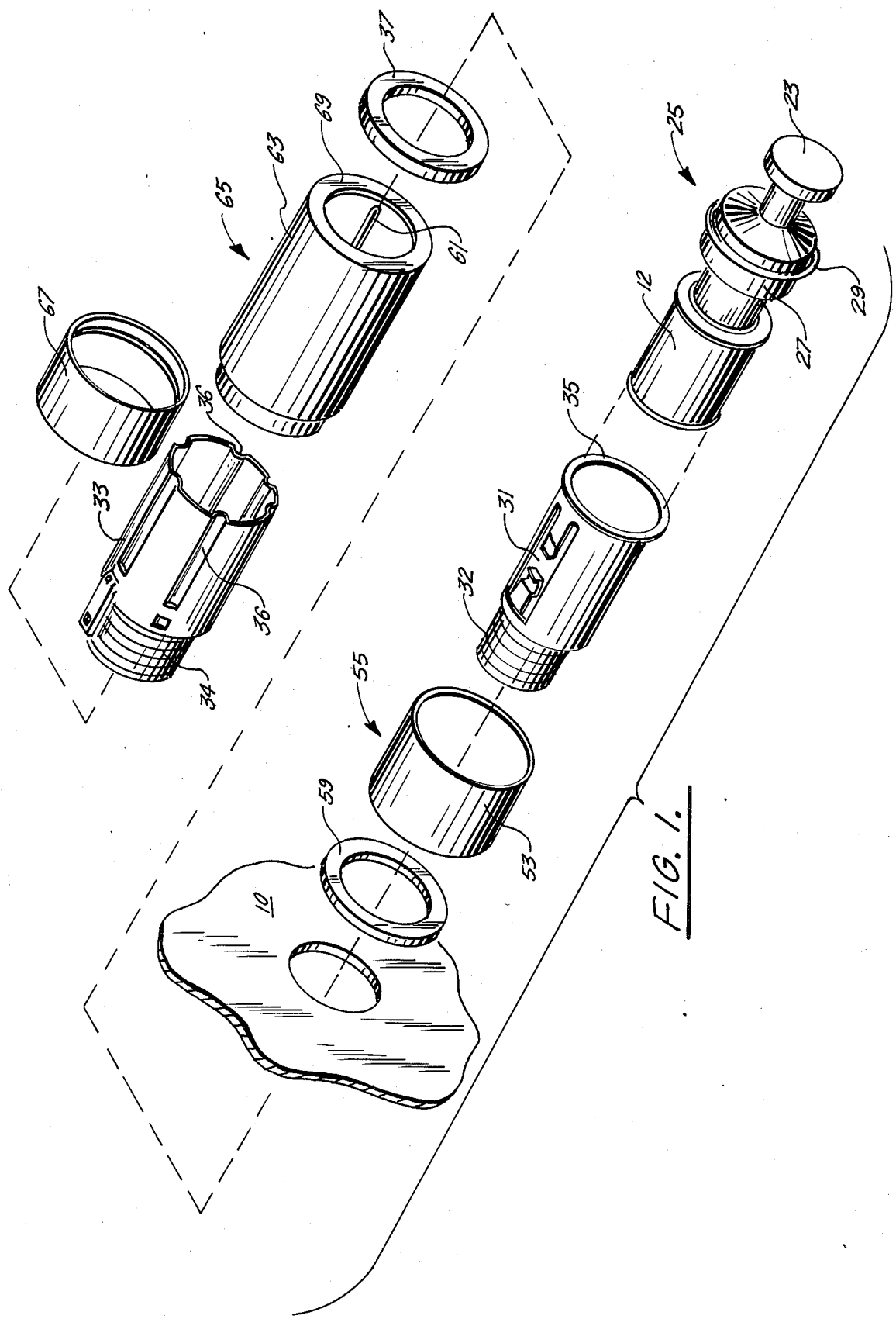
FIG. 1 is an exploded view, in perspective, of a waterproofing system of this invention.
Figure 2:
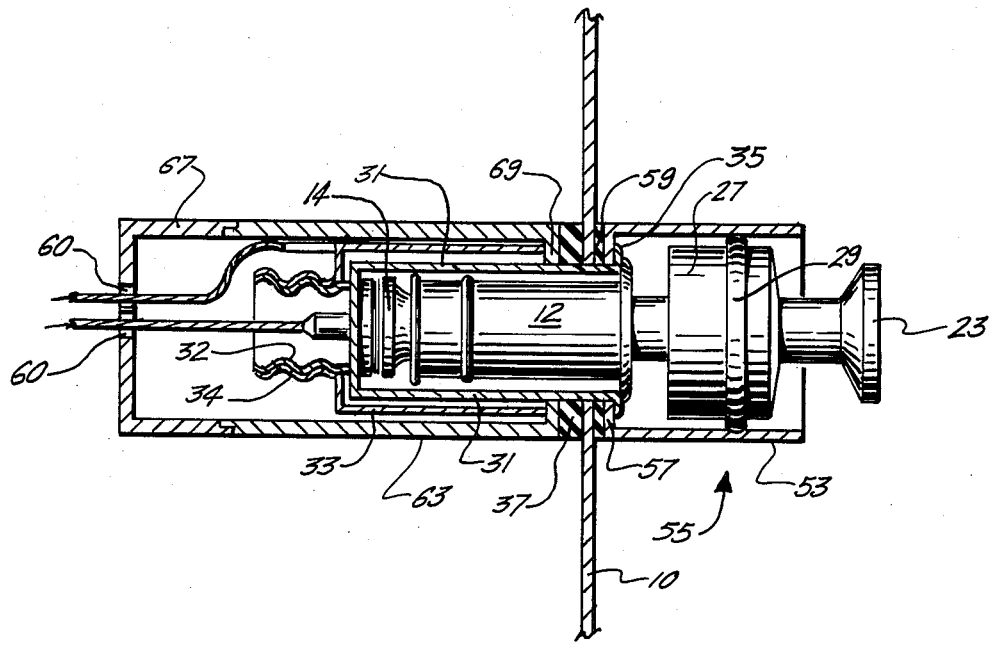
FIG. 2 is a side view, partly in section, of a system of this invention in assembled form.
Figure 3:
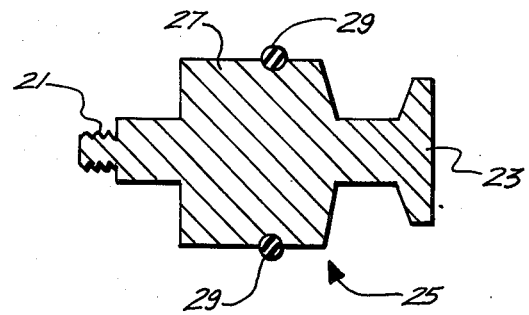
FIG. 3 is a side view, in section, of a knob of this invention.

It will be readily apparent from an inspection of the drawing that it illustrates each of the embodiments referred to above.

Referring now to the drawings in which like numerals represent like parts in the respective views, the handpiece is composed of longitudinally slidable tubular carrier means 12, an electrically heatable ignition member 14, and a knob 25. Knob 25 is threadably secured to carrier means 12 by means of threaded stud 21. Member 14 usually comprises a spiral of metal which becomes red hot when an electric current is caused to flow through it. Carrier means 12 may be composed of one longitudinally slidable member or it may comprise a pair of concentric longitudinally slidable members one slidable within the other. In either event it is normally spring loaded to enable it to function in the usual manner. However since the handpiece except for the knob construction is conventional and the particular design and construction details of the handpiece—except for the knob—are of no importance to this invention they need not be further considered herein.

The knob, which does constitute an embodiment of this invention, is composed in the form depicted of handle portion 23, increased diameter portion 27, and O-ring 29 fitted into a groove which extends around the periphery of the increased diameter portion 27. The O-ring, which serves as a sealing member, is preferably composed of a firm elastomeric or plastic material such as hard rubber, polytetrafluoroethylene, or the like. It will of course be understood and appreciated that more than one O-ring may be used on the knob, if desired.

In the form depicted the socket is composed of an inner receptacle 31 and an outer body 33. Receptacle 31 and body 33 are concentrically arranged and threadably secured together at one end by means of threaded boss 32 and threaded boss 34, the threads of which are matched with each other. The opposite end portion of receptacle 31 extends beyond the adjacent end of body 33, passes through an aperture in panel 10, and terminates in an outwardly extending flange 35. In conventional practice the socket is equipped with stops, and electrical wiring and contacts, but since these details form no part of this invention they need not be further considered herein. The important thing about the socket is that it slidably receives carrier means 12 and is designed and constructed so that when carrier means 12 is pushed to an inner position by means of knob 25, electrical energy is caused to heat ignition member 14. And, as noted above, in most conventional lighter systems the entire handpiece pops back to its original position when ignition member 14 has reached the appropriate temperature for use. Thereupon the entire handpiece can be removed from the socket by pulling on the handle portion 23 of knob 25.

In the preferred form depicted the front housing member 55 is composed of a tubular wall 53 terminating at its inner end with an inwardly extending flange 57. The opposite end of housing member 55 is open to permit insertion and removal of the handpiece. If desired a removable cap (not shown) may be fitted onto the end of member 55 to cover the entire opening as well as handle portion 23. Housing member 55 is fabricated from any suitable waterproof material such as metal, ceramic, or plastic material.

It will be noted that inwardly extending flange 57 fits behind outwardly extending flange 35 thereby forming an interlockable union. Washer 59 is positioned between flange 57 and the outer face of panel 10 to further protect against seepage of water into the system. Thus by tightening body 33 onto receptacle 31 by screwing threaded boss 34 onto threaded boss 32 flange 35 of receptacle 31 is drawn tight against flange 57, washer 59 and panel 10. Consequently in this particularly preferred arrangement housing member 55 is secured to panel 10 by the same means that secure the socket to the panel.

The drawing also depicts the use of a rear housing member 65 which although optional is desirable in cases where maximum protection against water exposure is sought. In this embodiment rear housing 65 fits over and encases the socket (i.e., receptacle 31 and outer body 33). Housing 65 is composed of a tubular body section 63 and a cap section 67 having apertures 60, 60 therein to accommodate the wires needed for the electrical circuitry. Body section 63 slidably fits around the socket, and cap section 67 completes the encasement by being pressed onto the end of body section 63, preferably with a tight or snap fit. For best results rear housing member 65 is composed of an electrically insulative substance such as hard rubber, plastic, glazed ceramic, or the like. Preferably the interior of body section 63 is equipped with longitudinal splines 61 to fit into longitudinal recesses 36 in housing 33 to keep the housing from rotating independently.

In the preferred form depicted the end of tubular body section 63 remote from the cap-receiving end has a radially inwardly extending flange 69 that extends far enough to be engaged by the end of body 33 and yet fit around the outer perimeter of receptacle 31. This enables the body section 63 to be securely fastened in place as will be described below.

A rubber or other non-conductive washer 37 is positioned around receptacle 31 between flange 69 and the rear face of panel 10.

Rear housing member 65 is composed of the two parts, viz., body section 63 and cap section 67, to enable the entire assembly to be fastened securely to panel 10. In particular, after fitting body section 63 onto receptacle 31 and inserting body 33 into the back end of body section 63, the back end of body 33 remains exposed so that body 33 can be screwed onto receptacle 31 by means of the threaded bosses 32 and 34. As noted above, this tightens flange 35 against the front face of panel 10, and this in turn secures front housing member 55 against washer 59 and the front face of panel 10 by means of flange 57. In addition, this tightening of body 33 on receptacle 31 also secures body section 63 against washer 37 and the rear face of panel 10 by means of flange 69 by virtue of the pressure exerted against flange 69 by the adjacent end of body 33. Thereafter cap section 67 is pressed onto the end of body section 63 to complete the waterproofing encasement of those portions of the lighter assembly that are located to the rear of panel 10. Once the handpiece is inserted into the socket, the seal between O-ring 29 and tubular wall 53 completes the waterproofing encasement of the entire lighter assembly.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

What is claimed is:

1. In a push-pull type electric lighter assembly comprising:
   (a) a handpiece which includes longitudinally slidable tubular carrier means having an inner end and an outer end, an electrically heatable ignition member carried by and positioned in proximity to the inner end of the carrier means, and a knob mounted on the outer end of the carrier means, and
   (b) socket means slidably receiving the carrier means and adapted to electrically energize the ignition member when the carrier means is moved into an inner position in the socket means,
   the improvement wherein the assembly further comprises:
   (c) hollow tubular housing means encasing the carrier means, the ignition member and the socket means, the outer end portion of the housing means being open to permit insertion of the handpipe into and removal of the handpiece from the socket means by means of the knob, and
   (d) sealing means to effect a watertight, slidable seal between a peripheral portion of the knob and the housing means yet permit the carrier means to be moved by means of the knob into said inner position in the socket means.

2. In an assembly in accordance with claim 1 wherein the improvement further includes the sealing means comprising at least one O-ring mounted around a peripheral portion of the knob.

3. In an assembly in accordance with claim 1 wherein the improvement further includes the housing means comprising a pair of longitudinally aligned members, namely a front housing member mountable against the front side of a panel adapted to carry the lighter assembly and a rear housing member mountable against the back side of the panel.

4. In an assembly in accordance with claim 3 wherein the improvement further includes the socket means including a pair of coaxially aligned concentric tubular means threadably secured to each other, wherein an end portion of the inside tubular means has a radially outwardly extending flange adapted to be positioned on the front side of the panel, and wherein the innermost portion of the front housing member has a radially inwardly extending flange adapted to be interlocked behind the flange of the inside tubular means and fastened against the front edge of the panel when said tubular means are threadably secured to each other.

5. In an assembly in accordance with claim 4 the improvement further including a watertight washer positioned between said inwardly extending flange and the front side of the panel against which said flange is fastened.

6. In an assembly in accordance with claim 4 the improvement further including a watertight washer postioned between the end of the rear housing member and the back side of the panel against which the rear housing member is fastened.

7. In an assembly in accordance with claim 4 the improvement further including (i) a watertight washer positioned between said inwardly extending flange and the front side of the panel against which said flange is fastened, and (ii) a watertight washer positioned between the end of the rear housing member and the back side of the panel against which the rear housing member is fastened.

8. In an assembly in accordance with claim 7 wherein the improvement further includes the knob being characterized by having a radially outwardly extending portion positioned in closer proximity to the carrier means than a handle portion of the knob and wherein said sealing means comprises an O-ring seal mounted around the periphery of said radially outwardly extending portion of the knob.

9. In combination, (i) a socket the outer end of which is adapted to protrude through an aperture in a panel, (ii) a handpiece adapted to be inserted into the socket, which handpiece includes longitudinal slidable tubular carrier means having an inner end and an outer end, an electrically heatable ignition member carried by and positioned in proximity to the inner end of the carrier means, and a knob mounted on the outer end of the carrier means, and wherein the handpiece is characterized by the improvement wherein the knob has an increased diameter portion positioned in closer proximity to the carrier means than a handle portion of the knob and wherein at least one O-ring is mounted around the periphery of said increased diameter portion of the knob and (iii) a hollow open-ended tubular housing member adapted to be coaxially aligned with the handpiece and to concentrically encase (a) the outer end portion of the socket which protrudes through said aperture and (b) the portion of the handpiece that extends out in front of the socket when the handpiece is seated therein, except for a handle portion of the knob, the O-ring of the handpiece being adapted to engage the interior wall of the housing member and form a watertight, slidable seal therewith yet permit the handpiece to be pushed into and be pulled from the socket by means of the handle portion of the knob.

10. A combination in accordance with claim 9 wherein the inner end of the housing member has a radially outwardly extending flange enabling the housing member to be secured to the panel by means of the end of the socket which protrudes through the aperture in the panel.

11. A combination in accordance with claim 9 wherein the end portion of the socket that protrudes through the aperture in the panel has a radially outwardly extending flange and wherein the inner end of the housing member has a radially inwardly extending flange adapted to fit behind said outwardly extending flange and thereby enable the housing member to be secured to the panel by the same means that secure the socket to the panel.

12. A combination in accordance with claim 11 wherein the O-ring is composed of relatively firm elastomeric or plastic material.

13. In a push-pull type electric lighter assembly comprising:
  (a) a handpiece which includes longitudinally slidable tubular carrier means having an inner end and an outer end, an electrically heatable ignition member carried by and positioned in proximity to the inner end of the carrier means, and a knob mounted on the outer end of the carrier means, and
  (b) socket means slidably receiving the carrier means and adapted to electrically energize the ignition member when the carrier means is moved into an inner position in the socket means, a portion of said socket means extending out in front of a panel on which it is mounted,
the improvement comprising:
  (c) hollow tubular housing means encasing:
    (i) the portion of the socket means extending out in front of the panel, and
    (ii) a portion of the handpiece extending out from the socket means when the handpiece is fitted into the socket means,
    the housing means being open to permit insertion of the handpiece into and removal of the handpiece from the socket means by means of the knob, and
  (d) sealing means to effect a watertight, slidable seal between a peripheral portion of the knob and the housing means yet permit the carrier means to be moved by means of the knob into said inner position in the socket means.

14. In an assembly in accordance with claim 13 the improvement further including means enabling the housing means to be secured to the panel by the same means that secure the socket to the panel.

* * * * *

UNITED STATES PATENT AND TRADEMARK OFFICE
CERTIFICATE OF CORRECTION

PATENT NO. : 4,622,454

DATED : November 11, 1986

INVENTOR(S) : Leopold A. Castille

It is certified that error appears in the above-identified patent and that said Letters Patent is hereby corrected as shown below:

Column 6, line 10, reads "handpipe", should read
-- handpiece --

Column 6, line 39, reads "edge", should read
-- side --

Column 6, line 48, reads "postioned", should read
-- positioned --

Column 7, line 2, reads "longitudinal", should read
-- longitudinally --.

Signed and Sealed this

Twenty-fourth Day of March, 1987

Attest:

DONALD J. QUIGG

Attesting Officer

Commissioner of Patents and Trademarks